(12) United States Patent
Chiang et al.

(10) Patent No.: US 9,865,009 B2
(45) Date of Patent: Jan. 9, 2018

(54) SYSTEM AND METHOD FOR VARIABLE PRICING OF DATA USAGE

(71) Applicants: Mung Chiang, Princeton, NJ (US); Sangtae Ha, Princeton, NJ (US); Soumya Sen, Princeton, NJ (US); Carlee Joe-Wong, West Hills, CA (US)

(72) Inventors: Mung Chiang, Princeton, NJ (US); Sangtae Ha, Princeton, NJ (US); Soumya Sen, Princeton, NJ (US); Carlee Joe-Wong, West Hills, CA (US)

(73) Assignee: THE TRUSTESS OF PRINCETON UNIVERSITY, Princeton, NJ (US)

( * ) Notice: Subject to any disclaimer, the term of this patent is extended or adjusted under 35 U.S.C. 154(b) by 290 days.

(21) Appl. No.: 13/916,525

(22) Filed: Jun. 12, 2013

(65) Prior Publication Data

US 2014/0006237 A1 Jan. 2, 2014

Related U.S. Application Data

(60) Provisional application No. 61/658,527, filed on Jun. 12, 2012, provisional application No. 61/658,519, filed on Jun. 12, 2012.

(51) Int. Cl.
*G07F 19/00* (2006.01)
*G06Q 30/04* (2012.01)
(Continued)

(52) U.S. Cl.
CPC .......... *G06Q 30/04* (2013.01); *G06Q 20/145* (2013.01); *H04L 12/1403* (2013.01);
(Continued)

(58) Field of Classification Search
CPC .................................................. G06Q 30/0283
(Continued)

(56) References Cited

U.S. PATENT DOCUMENTS

2006/0073810 A1* 4/2006 Pyhalammi ............. H04L 12/14
455/407
2010/0017506 A1* 1/2010 Fadell ................... H04M 15/00
709/224

(Continued)

OTHER PUBLICATIONS

Cheng. R ., "Verizon to curb highest data users". Feb. 4, 2011. Wall Street Journal.
(Continued)

*Primary Examiner* — Rokib Masud
(74) *Attorney, Agent, or Firm* — Meagher Emanuel Laks Goldberg & Liao, LLP

(57) ABSTRACT

A system and method for delivering variable pricing of data usage to a user device operated by a user is disclosed. The system includes a server configured with a usage monitor configured to identify the user and monitor usage patterns of the user device. The server has a pricing policy engine configured to generate pricing information based on at least one of the identity of the user and the usage patterns. The pricing policy engine is configured to transmit the pricing information to the user device. The user device is configured with a usage controller having a user interface configured to receive a delay preference selection identifying at least one delay tolerant application. The usage controller is configured to receive pricing information from the pricing policy engine and to delay data usage to the delay tolerant application based on the delay preference selection and the pricing information.

13 Claims, 14 Drawing Sheets

(51) Int. Cl.
G06Q 20/14 (2012.01)
H04M 15/00 (2006.01)
H04L 12/14 (2006.01)

(52) U.S. Cl.
CPC ........ H04L 12/1485 (2013.01); H04M 15/43 (2013.01); H04M 15/58 (2013.01); H04M 15/80 (2013.01); H04M 15/81 (2013.01)

(58) Field of Classification Search
USPC .................................. 705/34, 7.38; 455/407
See application file for complete search history.

(56) References Cited

U.S. PATENT DOCUMENTS

| 2010/0185489 | A1* | 7/2010 | Satyavolu | G06Q 10/063 705/7.38 |
| 2012/0117478 | A1* | 5/2012 | Vadde | G06F 9/54 715/736 |
| 2013/0159150 | A1* | 6/2013 | Hao | G06Q 10/06 705/30 |

OTHER PUBLICATIONS

Cisco Systems ., "Cisco visual networking index: Forecast and methodology", 2011-2016, May 30, 2012. http://tinyurl.com/VNI2012.

Clark, D. D., "Internet cost allocation and pricing", In Internet Economics, L. W. McKnight and J. P. Bailey, Eds. The MIT Press, 1997, pp. 215-252.

Cocchi, R., Shenker, S., Estrin, D., and Zhang, L., "Pricing in computer networks: Motivation, formulation, and example", IEEE/ACM Transactions on Networking 1 (1993), 614-627.

Falaki, H., Mahajan, R., Kandula, S., L Ymberopoulos, D., Govindan, R., and Estrin, D., "Diversity in smartphone usage", In Proc. of ACM MobiSys (2010), ACM, pp. 179-194.

Goldman, D., "AT&T hikes rates on smartphone plans", Jan. 19, 2012. CNN Money.

Gupta, A., Stahl, D., and Whinston, A., "Priority pricing of integrated services networks", In Internet Economics, L. W. McKnight and J.P. Bailey, Eds. The MIT Press, 1997, pp. 323-352.

Ha, S., Sen, S., Joe-Wong, C., Im, Y., and Chiang, M., TUBE survey questions and demographics, Jan. 2012. http://scenic.princeton.edu/tube/TUBE_Survey.pdf.

Joe-Wong, C., Ha, S., and Chiang, M., "Time-dependent broadband pricing: Feasibility and benefits", Proc. of IEEE ICDCS (Jun. 2011 ).

Kelly, F., Maulloo, A. K., and Tan, D. H. K., "Rate control for communication networks: Shadow prices, proportional fairness, and stability", Journal of Operational Research Society 49 ( 1998), 237-252.

Mackie-Mason, J., and Varian, H., "Pricing the Internet. In Public Access to the Internet", B. Kahin and J. Keller, Eds. Prentice-Hall, 1995, pp. 269-314.

Mackie-Mason. J. K ., Murphy. L., and Murphy, J., "Responsive pricing in the Internet", In Internet Economics, L. W. McKnight and J.P. Bailey, Eds. The MIT Press, 1997, pp. 279-303.

NIST. Engineering Statistics Handbook. http://itl.nist.gov/div898/handbook/pmc/section4/pmc435.htm.

Odlyzko, A., "Paris metro pricing for the Internet", Proc. of the 1st ACM Conf. on Electronic Commerce (Nov. 1999).

Parris, C., Keshav, S., and Ferrari, D., "A framework for the study of pricing in integrated networks", Tech. rep., Tenet Group, ICSI, UC Berkeley, 1992. TR-92-016.

Semret, N., Liao, R. R.-F., Campbell, A. T., and Lazar, A., "Pricing, provisioning and peering: Dynamic markets 16 for differentiated internet services and implications for network interconnections", IEEE Journal on Selected Areas in Communications 18 (2000), 2499-2513.

Sen, S., Joe-Wong, C., Ha, S., and Chiang, M., "Pricing data: A look at past proposals, current plans, and future trends", arXiv (Feb. 2012). http:l/arxiv.org/abs/1201.4197.

Shih, J., Katz, R., and Joseph, A., "Pricing experiments for a computer-telephony-service usage allocation", In Proc. of IEEE Globecom (2001), val. 4, IEEE, pp. 2450-2454.

Song, C., Qu, Z., Blumm, N., and Barabasi, A., "Limits of predictability in human mobility", Science 327, 5968 (2010).

Taylor, J., "Short-term electricity demand forecasting using double seasonal exponential smoothing", Journal of the Operational Research Society (2003), 799-805.

Taylor, P., "AT&T imposes usage caps on fixed-line broadband", Mar. 14, 2011. Financial Times.

The Economist., "The mother of invention: Network operators in the poor world are cutting costs and increasing access in innovative ways", Sep. 24, 2009. Special Report.

Varaiya, P. P., Edell, R. J., and Chand, H., INDEX project report, Aug. 1996. http:/jpeople.ischool.berkeley.edu/-hal/index-project/R98_005P.PDF.

Welch, C., "Verizon to kill grandfathered unlimited data plans for customers seeking upgrades", May 16, 2012. The Verge.

* cited by examiner

SYSTEM AND METHOD FOR VARIABLE PRICING OF DATA USAGE

CROSS-REFERENCE TO PRIOR FILED APPLICATIONS

This application claims priority to U.S. provisional application 61/658,519 and U.S. provisional application 61/658,527, both filed on Jun. 12, 2012 which are incorporated by reference herein in their entirety.

FIELD OF INVENTION

The present invention relates to systems and methods for implementing variable data pricing plans, and more specifically to facilitating user experience in accessing price and data usage information, as well as in configuring their delay sensitivities for applications and their scheduling.

BACKGROUND

Currently in the United States, Internet service providers, both wired and wireless (cellular), employ standard schemes such as flat rate pricing, usage based pricing with caps, tiered pricing or some combination of these. However, given the rapid growth in bandwidth demand from data hungry applications, providers are looking to explore newer pricing schemes that are more dynamic in nature, i.e. in which the price gets updated depending on traffic conditions, such as Time Dependent Pricing (TDP), Location Dependent Pricing (LDP), Congestion Dependent Pricing (CDP) etc. Under these pricing schemes there could be different plans, for example, flat to a cap and then throttle (e.g. a new plan from T-Mobile) or Intelligent Flat Rate plan. The systems and methods disclosed herein address a variety of problems with implementing such systems including: a user interface that uses time dependent pricing to schedule user specified non-critical applications so as to remain within a given monthly budget, and middleware that may be located at a base station in a cellular network and/or in pricing servers in wired networks to support different types of pricing schemes and data plans.

SUMMARY OF THE INVENTION

A system and method for delivering variable pricing of data usage to a user device operated by a user is disclosed. The system includes a server configured with a usage monitor configured to identify the user and monitor usage patterns of the user device. The server has a pricing policy engine configured to generate pricing information based on at least one of the identity of the user and the usage patterns. The pricing policy engine is configured to transmit the pricing information to the user device. The user device is configured with a usage controller having a user interface configured to receive a delay preference selection identifying at least one delay tolerant application. The usage controller is configured to receive pricing information from the pricing policy engine and to delay data usage to the delay tolerant application based on the delay preference selection and the pricing information.

The usage controller may be configured to delay data usage to the delay tolerant application based on data usage pricing for a node to which the user device is connected. The usage controller may be configured to allow data usage to the delay tolerant application when the user device is coupled to a node having data pricing below a preemptive download threshold price. The usage controller may be configured to temporarily suspend a data usage by the delay tolerant application when the user device is connected to a node having data pricing above a maximum price threshold. The usage controller may be configured to resume data usage by the delay tolerant application when the user device is connected to a node having data pricing below the maximum price threshold. The usage controller may be configured to delay data usage to the delay tolerant application based on a congestion level at the node to which the user device is connected. The usage controller may be configured to delay data usage to the delay tolerant application based on an amount of data used by the user device over a given time period.

The user interface may be configured to allow selection between congestion-dependent, location-dependent, and usage-based pricing plans. The user interface may be configured to present a data usage budget and a current usage level. The user interface may be configured to present data usage and time/date information. The user interface may be configured to present currently available price discounts. The user interface may be configured to present a historical bandwidth usage of at least two applications running on the user device.

A server configured to deliver variable pricing of data usage to a user device operated by a user is disclosed. The server includes a usage monitor configured to identify the user and monitor usage patterns of the user device; a pricing policy engine configured to generate pricing information based on at least one of the identity of the user and the usage patterns; a delegation controller configured to receive a delay preference selection including pricing plan information; and a usage controller configured to receive pricing information from the pricing policy engine, the server being configured to delay data usage to the delay tolerant application based on the delay preference selection and the pricing information.

The delay preference selection may include identifying at least one delay tolerant application. The usage controller may be configured to delay data usage to the delay tolerant application based on data usage pricing for a node to which the user device is connected. The usage controller may be configured to allow data usage to the delay tolerant application when the user device is coupled to a node having data pricing below a preemptive download threshold price. The usage controller may be configured to temporarily suspend a data usage by the delay tolerant application when the user device is connected to a node having data pricing above a maximum price threshold. The usage controller may be configured to resume data usage by the delay tolerant application when the user device is connected to a node having data pricing below the maximum price threshold. The usage controller may be configured to delay data usage to the delay tolerant application based on a congestion level at the node to which the user device is connected. The usage controller may be configured to delay data usage to the delay tolerant application based on an amount of data used by the user device over a given time period.

A method for delivering variable pricing of data usage to a user device operated by a user is disclosed. The method includes receiving user device communications at a server and identifying the user and monitoring usage patterns of the user device; generating pricing information based on at least one of the identity of the user and the usage patterns; transmitting the pricing information to the user device; and receiving a delay preference selection at the user device, the delay preference selection identifying at least one delay tolerant application, receive pricing information at the user device and delaying data usage to the delay tolerant application based on the delay preference selection and the pricing information.

Another method for delivering variable pricing of data usage to a user device operated by a user is disclosed. The method includes receiving user device communications at a server and identifying the user and monitoring usage patterns of the user device; generating pricing information at the server based on at least one of the identity of the user and the usage patterns; receiving a delay preference selection at the server, the delay preference selection including pricing plan information; and receiving pricing information at the server and delaying data usage to the delay tolerant application based on the delay preference selection and the pricing information.

A computer-readable medium having stored thereon a computer program for execution by a processor configured to perform a method for delivering variable pricing of data usage to a user device operated by a user is disclosed. The method includes receiving user device communications at a server and identifying the user and monitoring usage patterns of the user device; generating pricing information based on at least one of the identity of the user and the usage patterns; transmitting the pricing information to the user device; receiving a delay preference selection at the user device, the delay preference selection identifying at least one delay tolerant application; and receiving pricing information at the user device and delaying data usage to the delay tolerant application based on the delay preference selection and the pricing information.

Another computer-readable medium having stored thereon a computer program for execution by a processor configured to perform a method for delivering variable pricing of data usage to a user device operated by a user is disclosed. The method includes receiving user device communications at a server and identifying the user and monitoring usage patterns of the user device; generating pricing information at the server based on at least one of the identity of the user and the usage patterns; receiving a delay preference selection at the server, the delay preference selection including pricing plan information; and receiving pricing information at the server and delaying data usage to the delay tolerant application based on the delay preference selection and the pricing information.

BRIEF DESCRIPTION OF THE FIGURES

FIG. 6b is a flowchart showing operation of the middleware architecture of FIG. 6a;

DETAILED DESCRIPTION OF THE INVENTION

Disclosed herein are systems and methods for implementing variable pricing plans for data usage. The system generally includes a user interface configured to access middleware with associated pricing databases via an Open Application Programming Interfaces (API). The term "price" as used herein encompasses units of currency such as dollars but also can encompass any type of incentive, which could be coupon, reward, exclusion from being counted as part of the volume that need to be under a cap before data throttling starts.

System Architecture and Middleware

The disclosed middleware has pricing databases for each dynamic and/or static pricing plan, which can be accessed from any Internet enabled device (e.g., smartphones, tablets, laptops, content provider or content delivery network servers, smart grid, etc.) via the API. Consequently, any device can query the middleware database to learn about current or future prices available at any location and thus have the choice to schedule application uploads/downloads at times when the prices are low so as to lessen network congestion and benefit users through better user experience or reward mechanisms in less congested times. Another aspect of this approach is that any device, running on different operating systems and versions etc., and irrespective of whether connected to wired Internet, wireless or smart grid, can query the databases. Such querying can be done either through a standalone application provided by service providers or through a development platform (shin layer over the OS) that queries on behalf of any application that is configured to use the APIs provided by this platform for such purposes.

Besides querying the current and future prices offered by the dynamic pricing schemes, users may also access his/her price and usage history, which can be valuable in settling billing contentions. The middleware architecture therefore provides a new distributed approach to offering different pricing schemes, and thus opening up new business opportunities for both content and service providers in innovating and delivering services to the users at lower cost.

Figure 1:
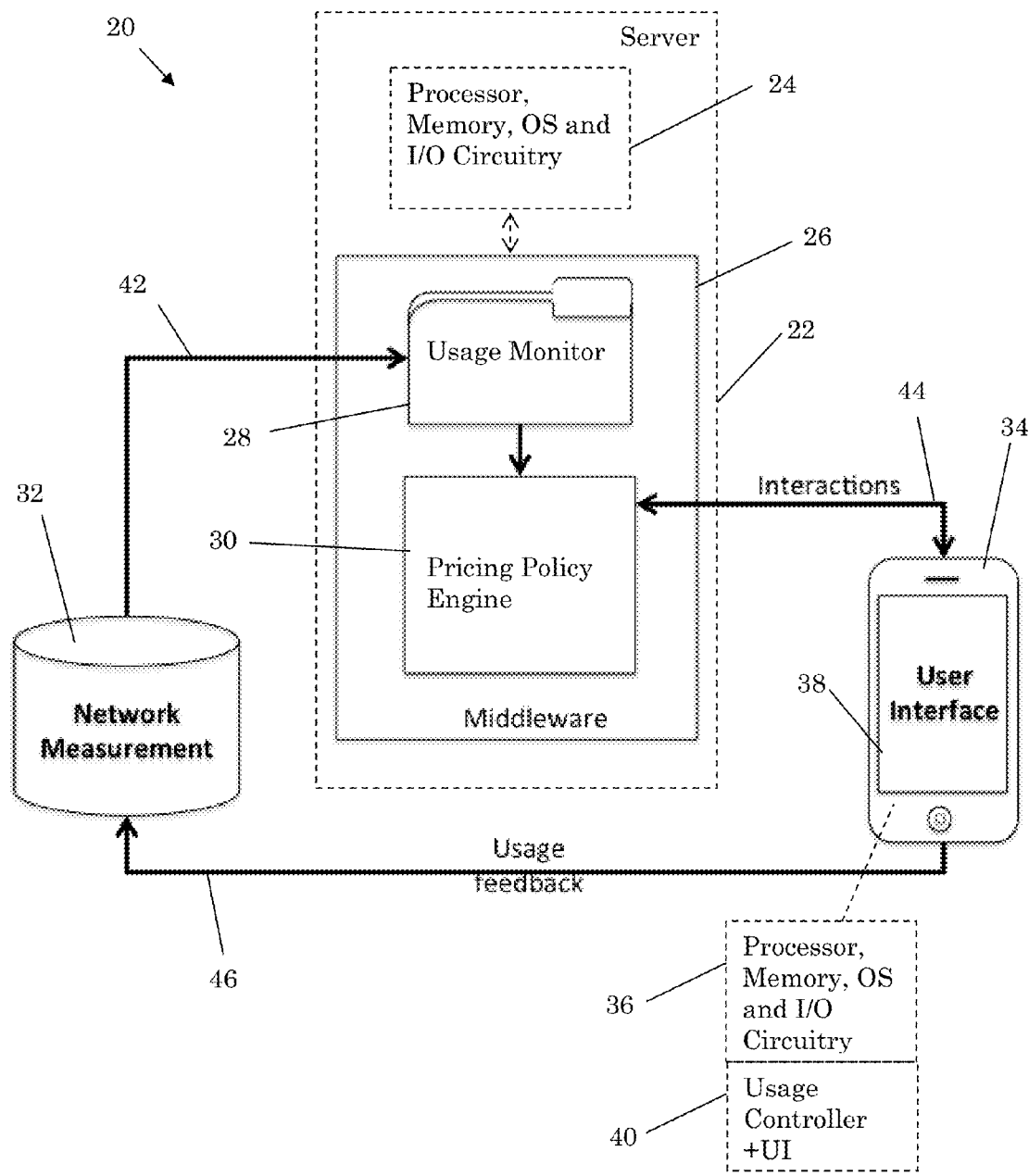
FIG. 1 is block diagram of a system configured for variable pricing of data usage showing the interaction between pricing middleware software and user interfaces (UIs) of Internet-enabled devices.

FIG. 1 is block diagram of a system configured for variable pricing of data usage showing the interaction between pricing middleware software and user interfaces (UIs) of Internet-enabled devices. The system includes a server 22 and one or more user device 34, shown generally as a smart phone. Server 22 generally includes a processor, memory, operating system and input/output circuitry as is well known in the art. Server 22 also includes a usage and pricing engine 26 including a usage monitor 28 and a pricing policy calculation engine 30. The usage monitor 28 is configured to access a network measurement database 32 as shown generally by line 42. It should be understood that network measurement/usage databases may be provided by a variety of know approaches, e.g., using usage logs gathered from an Internet Service Provider's (ISP's) RADIUS (Remote Access Dial-In User Service) server, or from CDR logs (call detail records) and the like.

User device 34 may be embodied in a wide variety of network or Internet enable devices such as personal computers, laptops, tablets, smart phones and the like. In this example the user device 34 is shown as a smart phone. The user device generally includes a processor, memory, operating system and input/output circuitry 36 as is well known in the art. The user device 34 also includes a usage controller with a user interface as discussed in more detailed below and shown generally by reference number 40. The user device 34 generally communicates with the server 22 as shown by line 44. The user device also communicates with the network measurement database 32 as generally shown by line 46. It should be understood that a wide variety of communications methods may be used without departing from the scope of this disclosure including wired and wireless connections. It should also be understood that the user device may communicate with the network measurement database 32 via a variety of paths including via the server 22. A more detailed description of system operation is set forth below.

Application 1: Price Dependent Data Synchronization

A Pricing Middleware approach allows the wireless/cellular Base Stations (or Pricing Servers in wired networks) to concurrently maintain different types of pricing approaches and advertise dynamic prices to the devices in the edge network. It provides Open APIs to edge devices to query for current prices, and given these prices, users can choose to exchange data, either manually or in some automated way.

With the growth in traffic from bandwidth-hogging applications and the need for synchronicity of content across many heterogeneous devices located at different physical locations, the amount of money that a user needs to pay under usage based pricing will hurt. Therefore, alternative dynamic pricing schemes, such as Time Dependent Pricing, Congestion Dependent Pricing, or Location Based Pricing, can be offered to users using this middleware architecture to allow them to save money by uploading/downloading data only at times when the price is low.

Figure 2A:
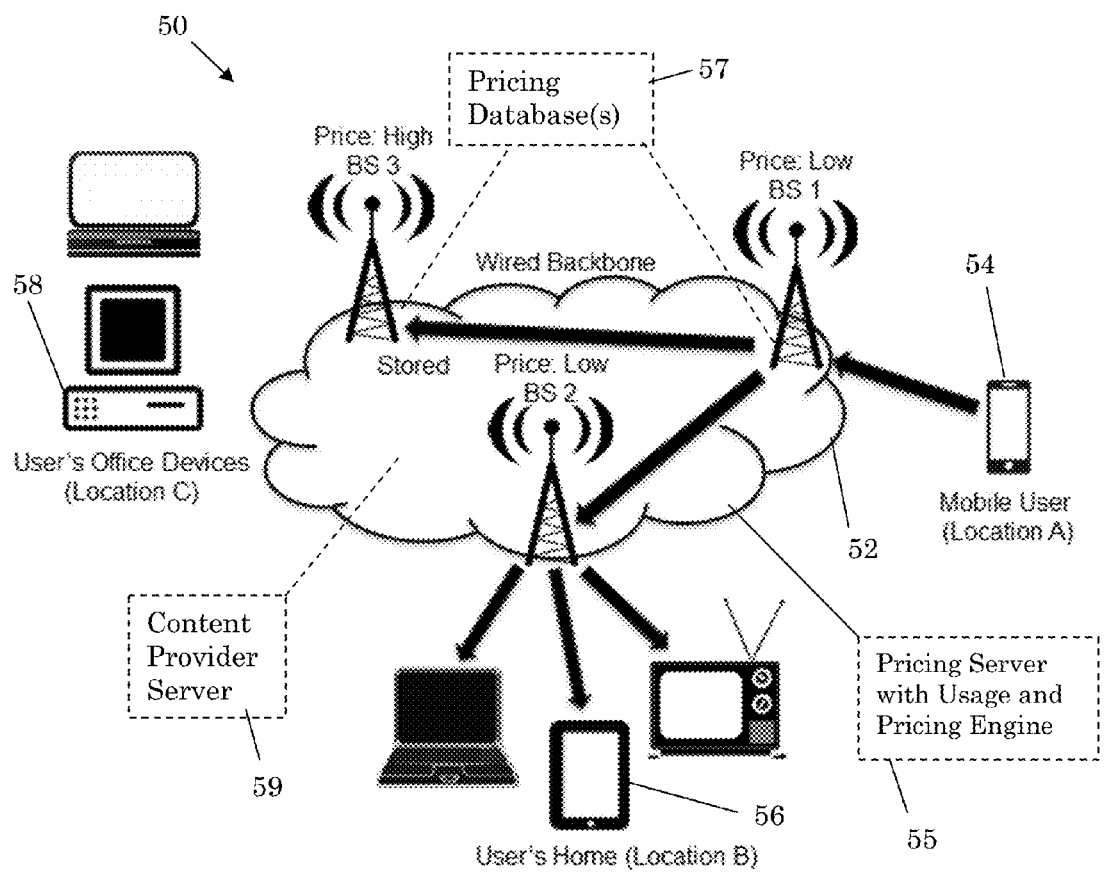
FIG. 2a is a block diagram of a price-dependent data synchronization architecture.

FIG. 2a, is a block diagram of a price-dependent data synchronization architecture 50. The system includes a wireless network 52, e.g., cellular based such as 3G or LTE and a plurality of mobile user devices. Suppose the mobile user (mobile user device 54) at location A takes a video and tries to upload it to the cloud. The price at the time in Base Station 1 (BS1) to which the user is connected is low, and therefore the video is transferred to some Content Provider (CP) server in the cloud. The CP server 59 is configured to access pricing server 55 that includes a usage and pricing engine, e.g., as shown in FIG. 1, that determines the location of the user's other devices (home user device 56 at location B and office user device 58 at location C). The pricing server 55 via its pricing policy engine queries a pricing database for the current prices associated with the user's location. Pricing information for each of the base stations may be stored in one or more pricing database(s) associated with a single base station or multiple base stations (in this example shown generally by reference number 57). Assume that the edge network prices at BS2, the user's home location, is low but the prices at BS3, the user's office location, is high. The usage controller located in the user devices will allow video to be delivered over the cloud (e.g., wired backbone, which is relatively less expensive to do) to the user's home devices but not to the user's office devices. The CP servers in the cloud will obtain price information for BS3 and therefore identify the time when the price will be low at BS3 for the office devices to be automatically synchronized from the CP servers in the cloud.

Figure 2B:
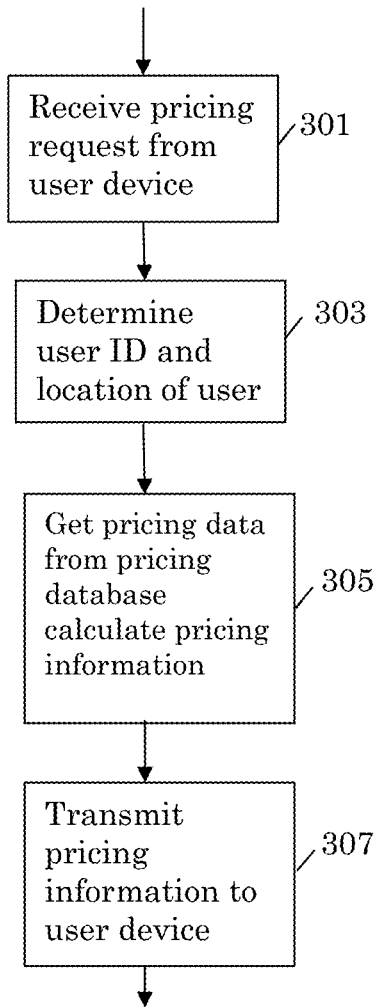
FIG. 2b is a flow chart showing basic server functionality.

FIG. 2b is a flow chart showing the basic server functionality discussed above. It should be understood that any flowcharts contained herein are illustrative only and that other program entry and exit points, time out functions, error checking routines and the like (not shown) would normally be implemented in typical system software. It is also understood that system software may run continuously after being launched. Accordingly, any beginning and ending points are intended to indicate logical beginning and ending points of a portion of code that can be integrated with other portions of code and executed as needed. The order of execution of any of the blocks may also be varied without departing from the scope of this disclosure. Implementation of these aspects is readily apparent and well within the grasp of those skilled in the art based on the disclosure herein.

The server receives a data price request from the user device as shown by block 301. The server determines the location of the user device as shown by block 303. The server queries the proper pricing database for applicable pricing data based on the user's location, e.g., based on the specific network node to which the user is connected, and calculates the pricing information for the user device as shown by block 305. It should be understood that the term "node" as used herein encompasses typical wireless nodes and may also encompass wired gateways. Examples detailing several approaches for determining pricing information is disclosed in disclosed in U.S. patent application Ser. No. 13/780,941, filed Feb. 28, 2013, entitled System and Methods for Time Dependent Internet Pricing, incorporated by reference herein in its entirety. The server transmits the pricing information to the user device as shown by block 307.

Application 2: Price Dependent Preemptive Downloads

The availability of a dynamic pricing middleware provides opportunity for Content Providers (CP) to preemptively 'push' data to users when the prices are sufficiently low. Many applications today fetch news articles, social network feeds, video links, photos of interest to the user, either in real-time or preemptively downloads them to the user's device. But with varying prices over different times of the day, the applications could download chunks of data at times when the prices go down. Similarly, with better digital rights management (DRM), CPs such as Netflix, Amazon Prime, Hulu etc., could provide users with the option of queuing downloads, which can be pushed to their devices when the prices at the base station (BS) of these devices are low.

Figure 3:
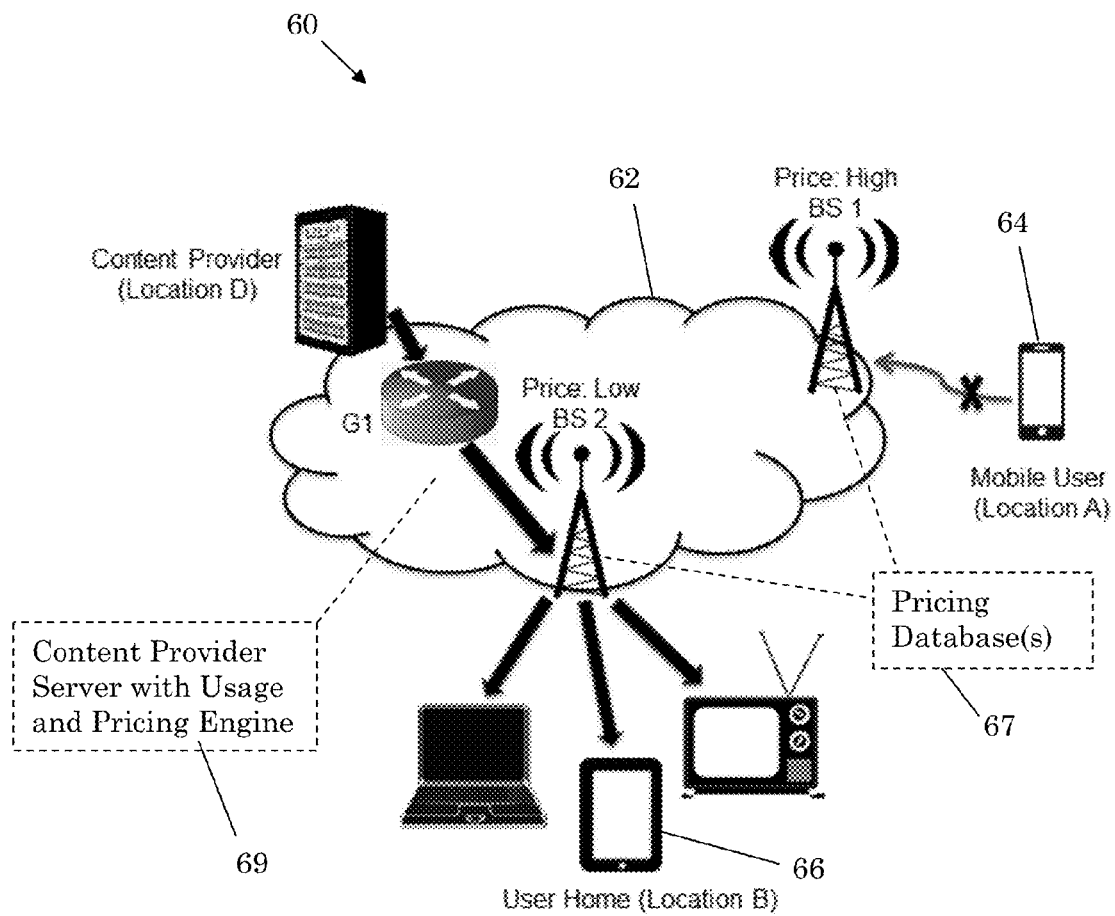
FIG. 3 is a block diagram of a price-dependent preemptive download architecture.

FIG. 3 is a block diagram of a price-dependent preemptive architecture 60. The system includes a wireless network 62 as disclosed above and a plurality of mobile user devices. Pricing information for each of the base stations may be stored in a pricing database(s) 67 as disclosed above. The CP server 69 includes a usage and pricing engine as disclosed above. In this example, the user device 64 is currently at location A and is not communicating with any of his/her home devices 66 at location B. In other words, the user is not involved in the process of preemptive downloading. However, the CP 69 server can contact pricing database for BS2 to get the current prices and schedule a preemptive download of application data of interest at low priced periods in accordance with user-specified preferences. Alternatively, the home devices could query the pricing database for BS2 to get price information and request a download from the CP servers as well. The middleware support for price-dependent preemptive downloads thus allows users to enjoy the content of their choice whenever they are ready while also having them pay relatively little for the bandwidth used in these transactions. This feature that can be offered by the middleware is referred to as "Save by Preemptive Download" (SPD) in this document, i.e., data is delivered the user device coupled to a node having data pricing below a preemptive download threshold price.

Application 3: Price-Dependent Termination of Non-Critical Downloads/Uploads.

Figure 4:
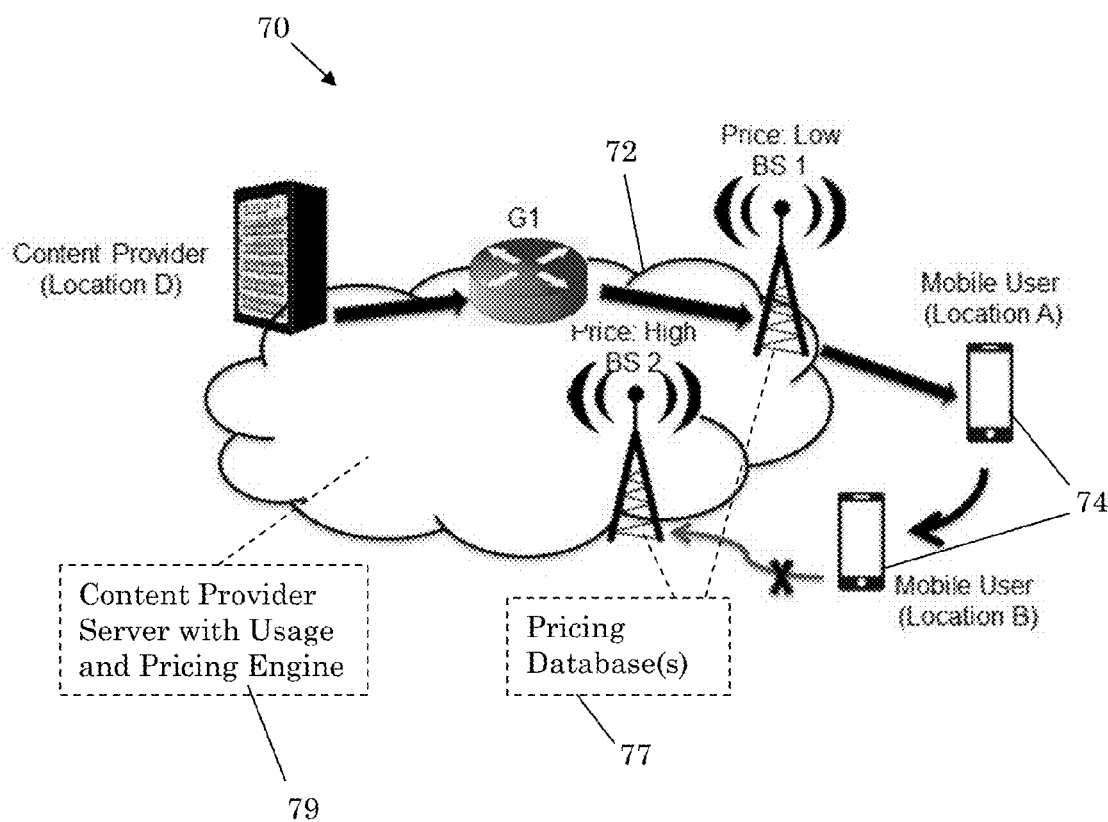
FIG. 4 is a block diagram showing a mobile user traveling from location A (near a low priced base station) to location B (near a high priced base station)

Non-critical applications can be completed by downloading or uploading data in small chunks when the price offered by the local base station is low. FIG. 4 is a block diagram wireless system 70 with a mobile user. Pricing information for each of the base stations may be stored in a pricing database(s) 77 as disclosed above. The CP server 79 may access a usage and pricing engine as disclosed above. In this example, system includes a wireless network 72 as disclosed and a mobile user 74 that is traveling from location A to location B. While at location A, the current price announced by BS1 was low and so the user's app was downloading data. But when the user moves to a different base station, which is more crowded and has a higher price at the time, the device can query for the current and future prices and decide to temporarily terminate or suspend the connection, i.e., when data pricing for the node exceeds a maximum price threshold. The system is configured to resume data communication at a later when the price is low again, i.e., below the maximum price threshold. Thus, the middleware approach provides a way of realizing price-dependent termination of non-critical downloads/uploads to help the user save money.

List of Other Applications:

Other features or applications that can be realized in the presence of this middleware are provided below.

Landline Pricing Schemes (LPS)—Relevant to pricing IPTV services. Intelligent Flat Rate (IFR) for LPS can be applied for wired networks. In IFR plans, a user pays a flat monthly budget and specifies delay tolerance (i.e. ability to wait for low-priced periods) for different applications using the user interfaces described later in this disclosure, and an intelligent scheduling software running in an "automated scheduling" mode on the user device schedules the traffic for the different applications according to the available future prices so as to keep the user from exceeding the flat-rate fee paid by the user.

Location Dependent Pricing (LDP)—This plan can charge users depending on the congestion level at the base station location that the user is connected to.

Satellite Capacity Management (SCM)—Satellite networks could provide TDP prices in these middleware DBs to shore up demand at off-peak times.

Two-sided Traffic Classification and Adaptive Pricing (TAP)—Such plans can allow Internet Service Providers (ISPs) to subsidize user's bandwidth cost by finding content providers or advertisers to sponsor such cost. This is conceptually similar to creating 1-800 numbers for data traffic where the cost of transporting the data is paid by the traffic source rather than the consumer.

Cloud spare Capacity Selling (CCS)—Dynamic pricing schemes supported by the middleware can be used to sell off spare cloud capacity at low spot prices.

Data-center Traffic Management (DTM)—Joint scheduling and Traffic Engineering (TE) through pricing in inter-DC Traffic Management (DTM). Such pricing can be used for Machine-to-machine (M2M) traffic exchange during less congested (low cost) time periods of the day.

Smart Grid Pricing (SGP)—SG devices (e.g. data center, electric car charging, factories, air conditioning) can communicate over the Internet to query dynamic pricing information from their SGP servers using this middleware.

This disclosure encompasses architectures with common pricing servers, which will serve as a middleware that provides a converged approach for Internet Service Providers (ISPs) to offer different dynamic pricing plans for their edge networks, and for a diverse range of devices (users and third party providers) to query for current/future prices on offer.

Figure 5:
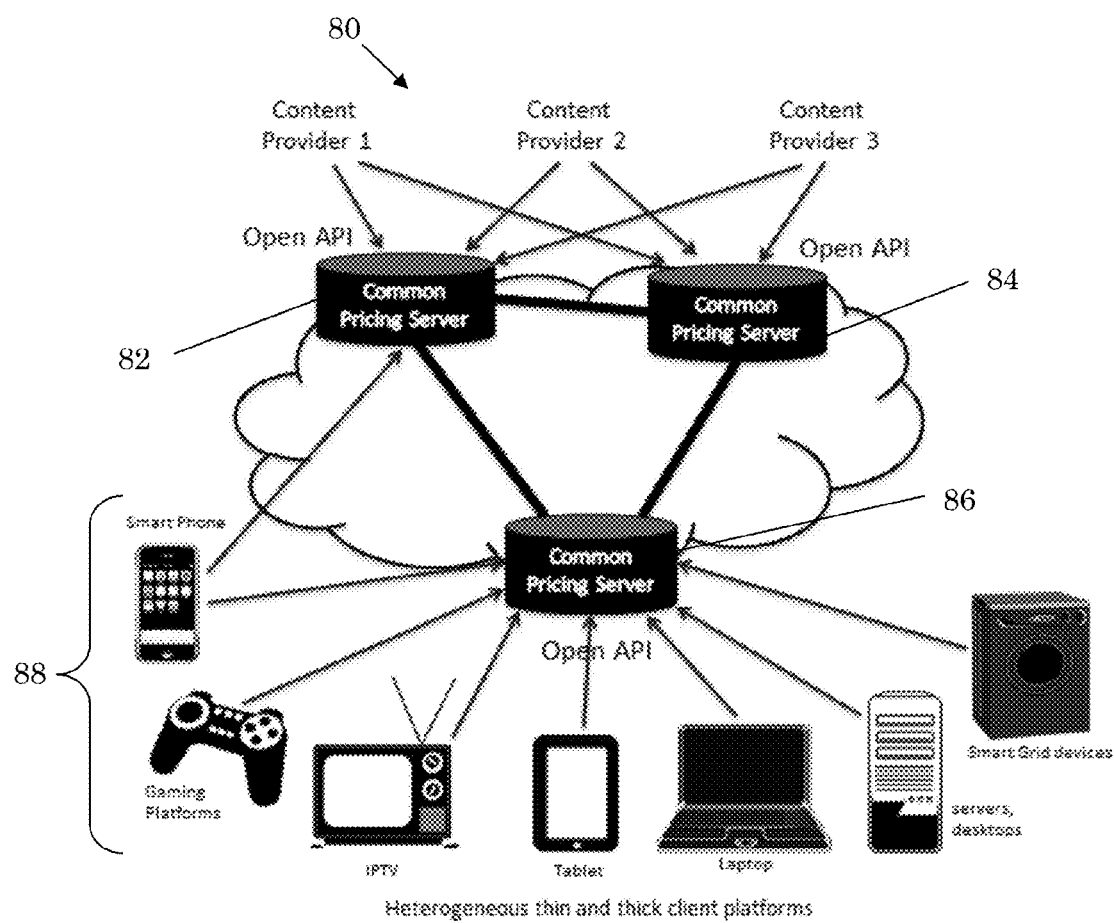
FIG. 5 is a block diagram showing the basic communication and framework for implementing a common pricing middleware approach.

FIG. 5 illustrates the basic communication and pricing framework supported with a Common Pricing approach. The system 80 includes one or more common pricing servers 82, 84, 86 and user devices 88 coupled via an open API. Various types of devices 88 (e.g., smart phones, gaming consoles, IPTV, Tablets, PCs, servers, Smart Grid devices) supported on various technologies can query the Common Pricing Servers 82, 84, 86 for price information via the open application programming interfaces (open APIs). Similarly, Content Providers (such as NetFlix, Amazon etc.) can query the pricing server database and schedule data transfer for various applications at times when the prices are low so as to help users save on data charges.

Figure 6A:
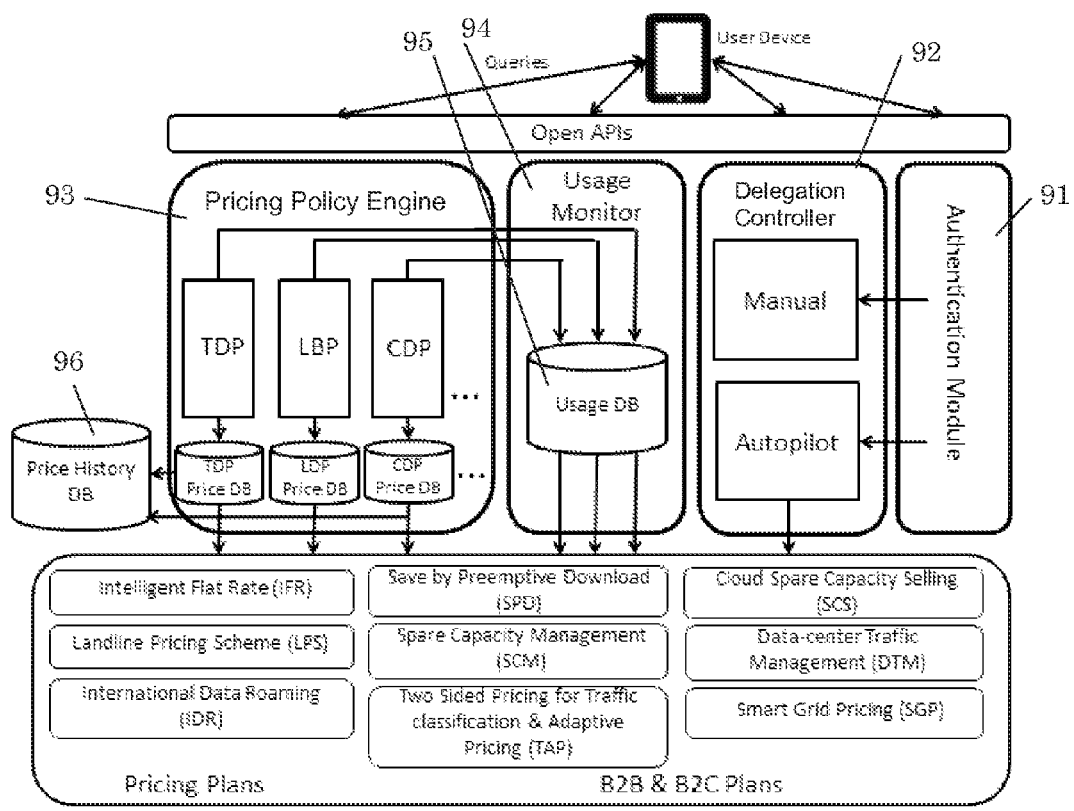
FIG. 6a is a block diagram of a middleware architecture for a common pricing server.

A middleware architecture for the Common Pricing Server is shown in FIG. 6a. The Common Pricing Server can provide web-based APIs (application programming interfaces) so that any device that supports web can exchange data with the ISP's server. The ISP server supports three modules:

(a) Authentication Module: The authentication module 91 authenticates connecting devices, infers delegation controller connected to this device account, identifies pricing plan that this device is on.

(b) Delegation Controller: The delegation controller 92 determines whether the data exchange needs to proceed though manual selection (explicit user engagement) or in an "autopilot" or automated scheduling mode of operation (see e.g., FIG. 8). In automated scheduling mode, either the user device can intelligently decide on whether to exchange data given the available pricing signal, or whether the server side itself should schedule or throttle the data traffic for certain traffic classes.

(c) Pricing Policy Engine: The pricing policy engine 93 observes usage volume of users as recorded by the usage monitor 94 in the usage database (DB) 95. The pricing policy engine 93 accesses the pricing database 96 to gather new pricing information to offer to the user devices. For certain type of plans, where the ISP is authorized to automatically throttle or block certain applications, this module can enforce such policies as well.

(d) Pricing plans: The pricing policy engine 93 can be used to realize an entire suite of pricing plans, including business-to-business (B2B) and business-to-consumer (B2C) plans.

In general the Common Pricing Server can include a layer of Open APIs that provide interfaces to an authentication module, a delegation controller for automated scheduling, a usage database, and a pricing policy enforcer. The Open API allows any kind of device and operating systems, communicating over any type of physical medium, to be able to authenticate and access the information made available in the usage and pricing databases. This architecture thus allows network operators and service providers to offer different types of dynamic and traditional pricing schemes through a converged architecture that can be queried by any device. The devices get the information about the offered prices and can choose whether or not to use the bandwidth.

The Pricing Policy engine 93 is configured to support a variety of pricing schemes such as Time Dependent Pricing (TDP), Location Based Pricing (LBP), Congestion Dependent Pricing (CDP), Usage Based Pricing (UBP) with or without data throttling over a cap, etc. (e.g., some of these plans are in practice for voice calls in India and Africa). The current and future prices on offer can be stored in respective price databases, which can be queried by external device. The Usage Monitor stores information about usage pattern and history of the users can be locally stored and accessed by the user. The information on usage patterns stored in the usage database can be internally used by the pricing policies to determine optimal prices to offer. The delegation controller enforces a user's choice between monitoring his/her usage manually and adjusting it to stay within the budget versus delegating that authority to Service Providers to automatically manage data traffic usage of the user so as to stay within a user-specified budget. This is particularly relevant in enforcing Intelligent Flat Rate pricing plans.

This kind of architecture is not currently in use by network or service providers as of today. ISPs in the United States are charging different types of predetermined pricing schemes, like flat fee, usage based, or tiered data plans, which do not require devices to query for dynamic price updates. Consequently, these pricing plans charge all users the same based on how much bandwidth they used rather than when they used it (i.e., whether at peak or off-peak hours). This will however change as ISPs shift towards charging differently in a dynamic manner based on current or predicted congestion levels. The introduction of Time Dependent and Congestion Dependent Pricing in the near future will motivate the creation and deployment of such a middleware approach, as devices will then query for price information and schedule their applications accordingly.

Figure 6B:
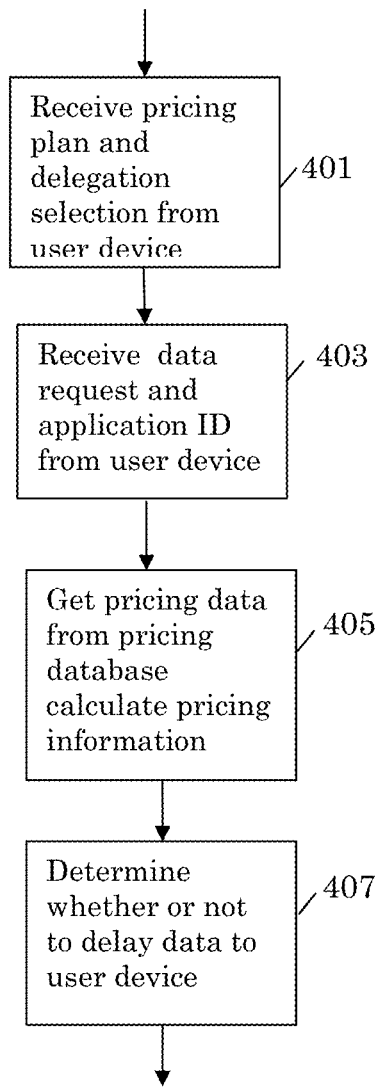

FIG. 6b is a flowchart showing operation of the middleware architecture of FIG. 6a. The user device transmits its pricing plan information to the server as shown by block 401. The user device also provides its delegation selections, e.g., selects delay tolerant applications or selects automated scheduling. The user device sends a request for data as shown by block 403. If automated scheduling is not selected, the user device also identifies the application for which the data is requested, e.g. by sending an application ID. The server determines the location of the user device as discussed above in connection with FIG. 2b. The server also server queries the proper pricing database for applicable pricing data based on the user's location, e.g., based on the specific network node to which the user is connected, and calculates the pricing information for the user device as shown by block 405. The server then determines whether or not to allow data used by the requesting application based on pricing plan and delegation selections (delay preference selections) and the pricing information as shown by block 407.

The architecture of FIG. 6a has several advantages in that it creates a converged platform with open interfaces that allows ISPs to offer many different types of dynamic pricing approaches. It can help in introducing new pricing plans, such as Intelligent Flat Rate (IFR), Landline Pricing Schemes (LPS) etc., as well as new B2B services based on price-dependent preemptive downloads, spare capacity management for satellite providers network cloud providers (e.g., devices could query for time-varying prices of satellite services and schedule bulk data transfers accordingly), cloud spare capacity selling (SCS), joint scheduling and traffic management in large data center networks depending on congestion prices, pricing of smart grid devices, and even two-sided pricing for B2C services. In particular, the ability of content providers (CPs) and users to query for price updates will open new business models in preemptive download and app scheduling in the cloud to save on data usage.

The middleware solves the ISP's problem of traffic congestion on their network by providing users with pricing incentives to defer their traffic to periods of lower network congestion. On the other hand, users get to benefit by reducing their monthly data plan budget from saving by waiting for non-critical traffic. The middleware support also opens up new business opportunities for Intelligent Flat Rate plans, Preemptive download for cloud services etc. The disclosed middleware may be employed for automated querying for prices, uploads and downloads at low-priced times, without having explicit user intervention.

The disclosed middleware may be employed by ISPs such as AT&T, Verizon, Vodafone etc. (for Intelligent Flat Rate, B2B approach for two-sided pricing), satellite service providers like SES (for spare capacity management using TDP), Content providers such as Netflix, Hulu, Amazon Prime (B2C approaches of preemptive download from priority content queues), Application developers like Deja, Zite, Flipboard etc., Social Networks like Facebook, Twitter (for price dependent content quality, feed updates etc.), Cloud providers like Apple, Google, Amazon, Netflix (e.g., for price-dependent preemptive downloads, backups, sync, etc.), etc.

User Interface

Also disclosed herein is usage controller with a graphical user interface (GUI) that implements variable pricing of data usage and can be used for various devices, such as, mobile phones, tablets, computers, TV, Smart Grid devices etc. The disclosed GUI design will facilitate the offering of a variety of entirely new time-dependent pricing schemes. Additional technical aspects are disclosed in: Soumya Sen, Carlee Joe-Wong, Sangtae Ha, Jasika Bawa, and Mung Chiang, *When the Price Is Right: Enabling Time-Dependent Pricing of Broadband Data, ACM SIGCHI* '13, 29 Apr., 2013 which is incorporated by reference herein in its entirety.

The disclosed GUI provides for new dynamic data plans, such as the time-dependent pricing plans (disclosed in U.S. patent application Ser. No. 13/780,941, filed Feb. 28, 2013, entitled System and Methods for Time Dependent Internet Pricing, incorporated by reference herein in its entirety). The disclosed design may employ existing technology for handling application inputs and application stacks. The disclosed design may be used in:

1) UI for offering different forms of Intelligent Flat Rate pricing plans, dynamic pricing plans, including time-dependent, congestion-dependent, location-dependent, and usage-based pricing etc., that have to account for user's budget, preferences, and delay tolerances for different apps for mobile phones, tablets, computers, TV, Smart Grid devices etc.

2) Offering time-dependent pricing for landline connections (Landline Pricing Schemes)

The disclosed design may also be used in:

1) UI for offering of quota-aware video streaming where users specify their budget constraint and preferences to let the system automatically adapt the video quality in order to remain within the specified budgets.

2) UI for TDP based "Save by Pre-emptive Download (SPD)" of data for B2B and B2C services (e.g. users can configure their budget and preferences, and create movie and music queues, which are download when price or congestion conditions are low)

3) Realizing time-dependent pricing for smart-grid devices whose UI can be used to set user's preferences, priorities, constraints, and scheduling.

4) UI for enabling cheaper International Data Roaming using TDP

5) UI to enable spare capacity selling in network clouds and satellite networks

6) UI for implementing TDP for Smart Grid Pricing (SGP) for data-centers, electric car recharging, air-conditioning, washing machines etc.

Figure 7:
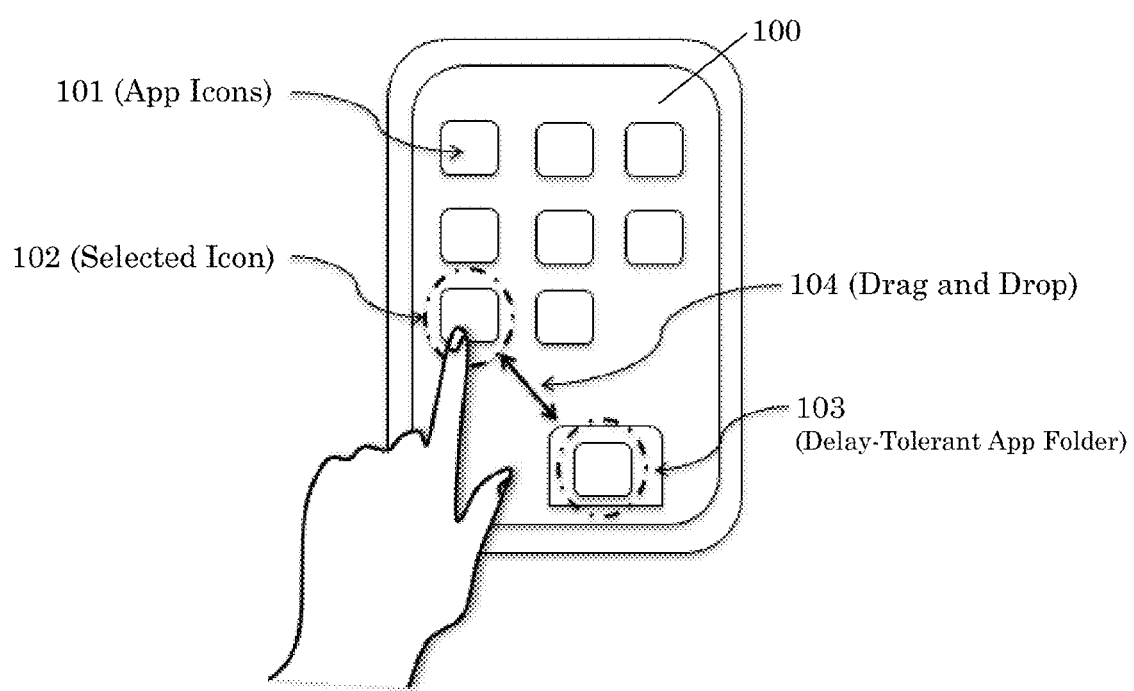
FIG. 7 is a diagram of a graphical user interface (GUI) being used by a user to specify a set of applications for which he/she is delay tolerant.
Figure 8:
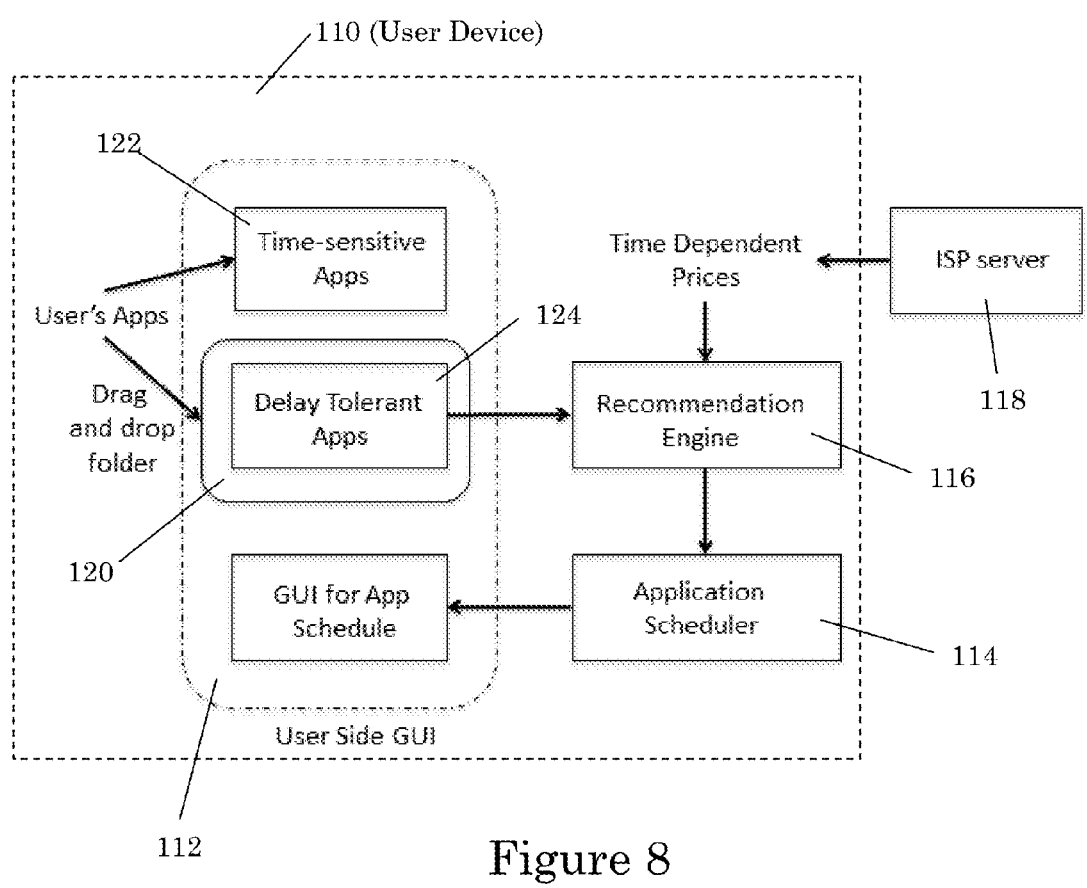
FIG. 8 is a block diagram of variable pricing of data usage based in user identified delay-tolerant applications.

As shown in FIG. 7, the user can specify a set of applications for which he/she is delay tolerant. In this example, the user device 100 has a display with a plurality of icons 101, each icon being associated with an application that runs on the user device 100 and may consume data. The user selects an icon for delegation by dragging and dropping 104 the icon into a delay tolerant application folder 103 (setting delay a preference for a delay tolerant application). The delay tolerant application can then be subjected to a variety of data pricing schemes such as automated scheduling based on time-dependent pricing (TDP) so as to remain within a given budget (FIG. 8). Alternatively, if the user operates the user device 110 in a manual mode, the recommendation engine 116 may provide delay/scheduling suggestions to the user for this set of applications. The application scheduler 114 then provides data to delay tolerant applications in accordance with the pricing approaches disclosed above. Using the GUI 112, the user can simply group all the delay tolerant applications 124 into one folder or bag by dragging and dropping them into it, e.g., delay tolerant app folder 120. ISP server 118 is generally configured to access pricing server 55 with a usage and pricing engine as disclosed above. Alternatively, the UI can provide the user device with the list of applications running on the device and let the user configure the delay tolerances for each by using a slider or option selection buttons.

A novel aspect of this simple drag and drop approach is that it provides a very easy-to-use and friendly UI for users to specify which set of applications can be scheduled based on variable pricing schemes including time-dependent pricing and various other techniques discussed herein.

Figure 9:
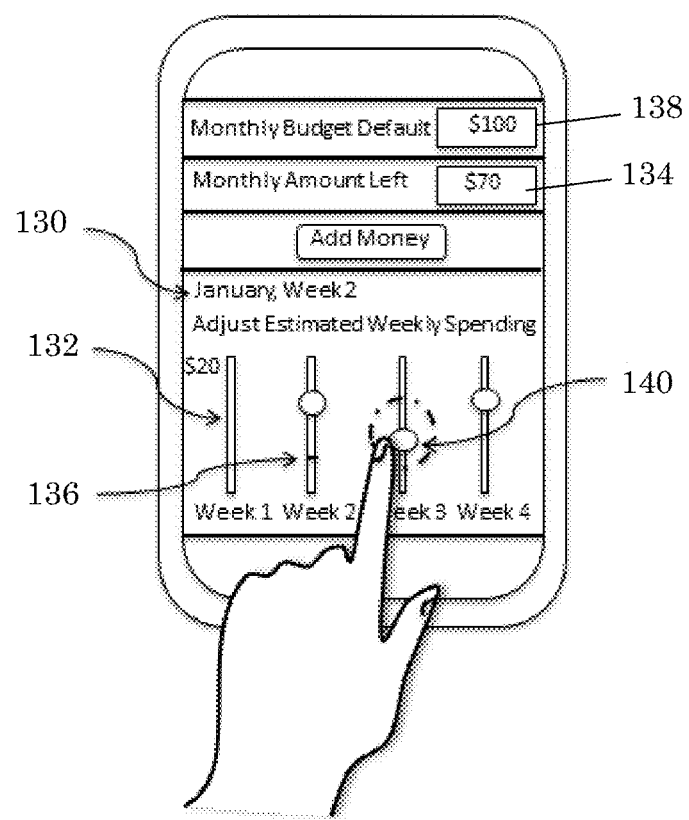
FIG. 9 is a block diagram of a GUI configured to specify a user's weekly budget allocation.

List of UI Features (FIG. 9):

1: Shows date, month and the current week as shown by reference number 130;

2: The week that is already in the past does not have a slider (i.e. allocation cannot be adjusted) as shown by reference number 132;

3: The amount already spent in the current week marks the lower limit beyond which budget allocation can still be adjusted for that week as shown by reference number 134;

4: User can slide up or down to adjust the allocation of any given week as shown by reference number 136;

5: User can see the default monthly budget, the amount spent, and can add money if needed as shown by reference number 138; and A user can manually adjust the budget allocated for each of the weeks ahead by adjusting the slider for the corresponding week as shown by reference number 140. This weekly allocation will be used as budget constraints under which the recommendation engine would try to schedule the delay-tolerant applications, e.g., under time-dependent pricing, so as to prevent the user from overshooting the allocated budget. The system will learn the user's spending pattern over time to set the default weekly allocations accordingly as time progresses, thus helping to automate the entire budget allocation process.

Figure 10:
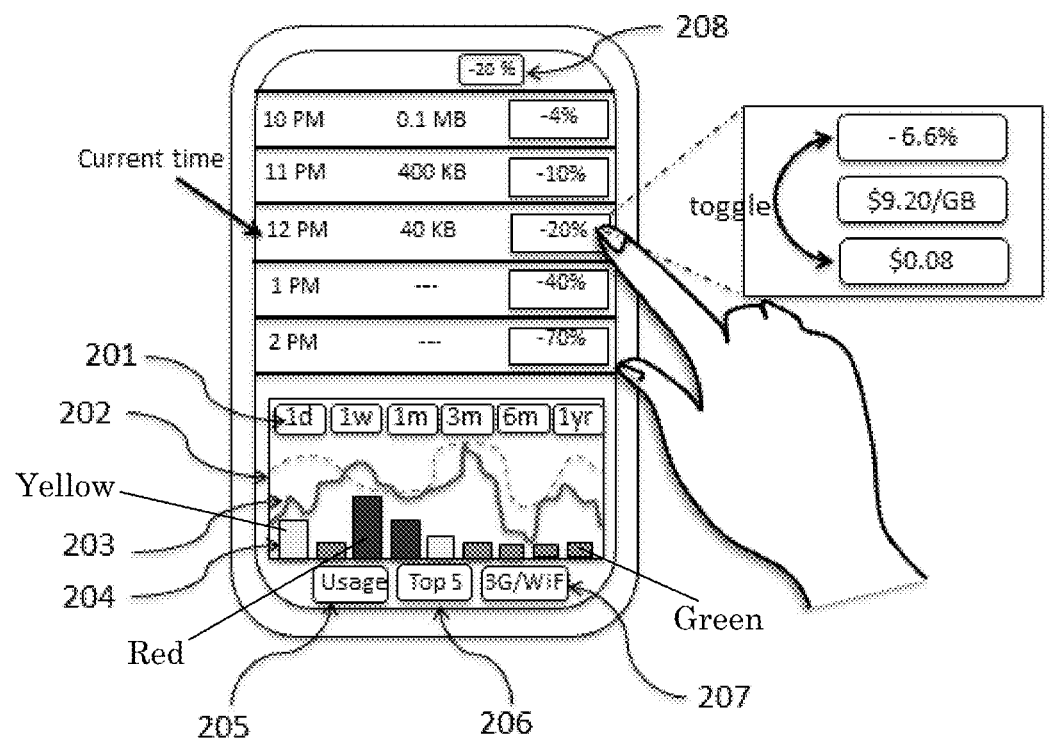
FIG. 10 is a block diagram of a GUI configured for a usage and pricing information summary.

List of UI Features (ref. to FIG. 10):

1: Granularity/resolution of historical usage and pricing data (1 day, 1 week, 1 month, 3 month, 6 month, 1 year) as shown by reference number 201.

2: Spending pattern; presents the net amount spent at any given time by multiplying the data usage with the price at the time of usage.

3: Usage history/pattern over different time periods (hour/day/week/month/year) as shown generally by reference numbers 202, 203.

4: Color-coded Time Dependent Pricing history over different time periods (hour/day/week). Typical color-coding follows red for high price period, yellow for intermediate, and green for low-priced time periods as shown generally by reference number 204.

5: Usage button 205 takes user to a new screen in which user can see usage history across different time periods by seamlessly swiping from one day to the next.

6: Top 5 button 206 shows the user the Top 5 Apps in terms of their bandwidth consumption, and also top applications on which the user spends most money.

7: 3G/WiFi button 207 allows user to switch between historical usage data from 3G and WiFi networks the user had connected to.

8: Shows real-time updates from the server on the currently available price discounts; the display is color-coded to visually notify the user whether the available discount is large or small.

The screen also shows the price information for the current time as well as the price discounts in some of the time slots in the recent past and future. On pressing the button, the user can toggle between different representations of that data in terms of actual price in $/MB or as a % discount. Additionally the user can also see a similar UI for the price discounts available in the next 24 hours and the schedule of using the delay tolerant apps that the recommendation engine maintains. It should be understood that the user interface may be expressed in any color scheme or numerical or other indication, discrete, binary (stop/go) or continuous to represent data current and historical usage.

Figure 11A:
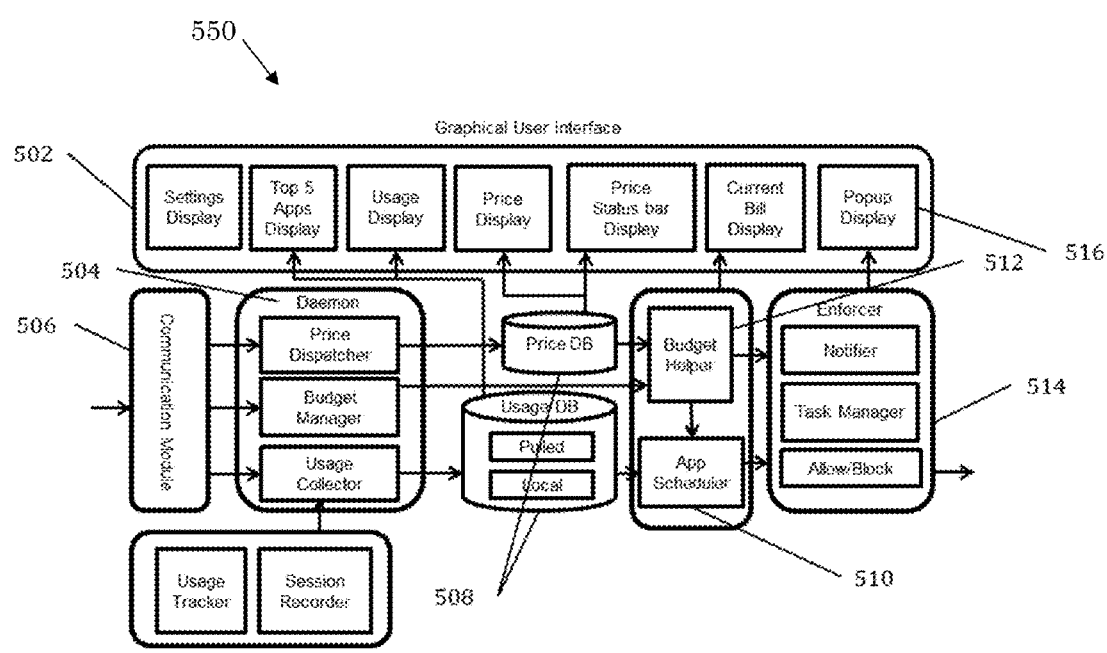
FIG. 11a is a block diagram showing the internal structure of a graphical user interface.

FIG. 11*a* is a block diagram showing the internal structure of a graphical user interface 550. This block diagram shows the modules of the UI-side application. The UI 550 provides users with various functionalities such as usage and price display, top bandwidth consuming applications (see discussion of FIG. 10 above). To support these features, the user side application or platform requires maintaining usage and pricing history databases, and a daemon to query for new pricing updates. To automate the scheduling of delay-tolerant apps, the UI-side application also requires a scheduler that will interact with the budget helper to schedule apps automatically in ways that will allow the user to remain within the budget. To enforce this in practice while keeping the process transparent to the users, the enforcer module can provide pop-up alerts and updates to the users and make the schedule of blocked and allowed apps available to the user (for potential manual override, if needed). The autopilot mode may use the scheduling processes disclosed in: Sangtae Ha, Soumya Sen, Carlee Joe-Wong, Youngbin Im and Mung Chiang, *TUBE: Time-Dependent Pricing for Mobile Data* SIGCOMM'12, Helsinki, Finland, Aug. 13-17, 2012 which is incorporated by reference herein in its entirety.

The UI 550 shows users various statistics about their data usage, e.g., amount used and historical prices as shown generally by reference number 502. The interface interacts with a daemon 504 to query the server for prices through a separate module 506. The price and usage are stored in databases 508. Given the price and app delay tolerances, the software uses a scheduler 510 to schedule different apps to subsequent times, using the budget helper 512 to take into account a user's leftover budget. The scheduling is enforced by a task manager 514 and a user is notified with a popup 516.

Figure 11B:
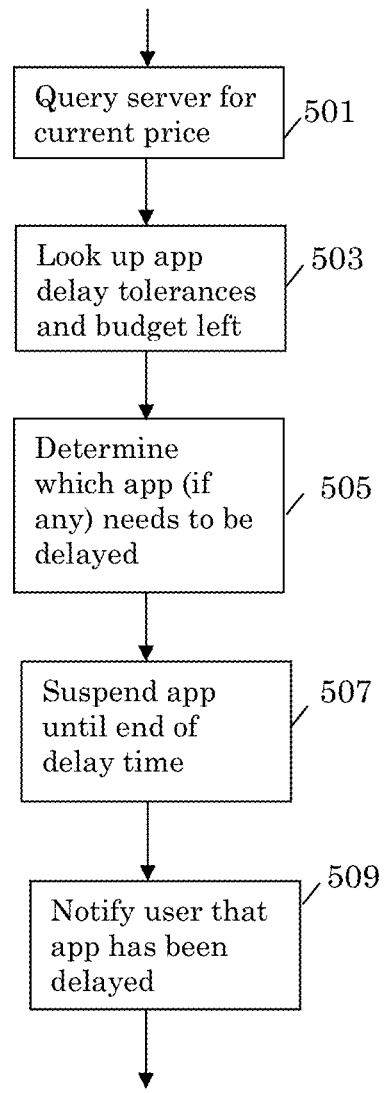
FIG. 11b is a flowchart showing operation of the graphical user interface.

FIG. 11*b* is a flowchart showing basic operation of the user interface of FIG. 11*a*. The user device queries the server for current pricing information as shown by block 501. The user device looks up delay tolerances, e.g., based on previously selected delay tolerant applications or automated scheduling, as shown by block 403. The user device determines whether or not to allow data used by the requesting application based on pricing plan and delegation selections (delay preference selections) and the pricing information as shown by block 505. Applications are delayed as needed to stay in budget as shown by block 507. The user is notified of the delay as shown by block 509.

The disclosed design has easy-to-use features that can be used with a variety of pricing plans including Time Dependent Pricing:

Color-coded button for price discount information of TDP

Drag-and-drop folder for grouping delay-tolerant/non-critical applications

Handset bandwidth consumption visualization tool (multi-timescale display of bandwidth usage history)

Auto pilot mode of scheduling user-specified delay-tolerant applications

Identity top 5 bandwidth consuming apps (feedback to the user about his/her usage and spending patterns)

User specific tailor made package with fixed price for Intelligent Flat Rate pricing (automatic scheduling of delay-tolerant apps to remain within the specified fixed budget)

Credit-based congestion usage

SLA-pricing joint agreement (UI to enable joint scheduling and traffic engineering through pricing in inter data center traffic management)

Weekly budget allocation and learning expected spending behavior

Parental control features that allow user to select time periods in which certain applications on the device will be blocked from accessing the Internet.

Disclosed is a graphical user interface for devices, which a consumer uses to access data or other commodities (e.g. electricity in smart-grids) and pays a service provider (e.g. an ISP) according to dynamic pricing policies.

GUIs in accordance with the disclosed design may be employed for different operating systems and devices in order to support dynamic pricing plans. The disclosed design accounts for user's ease of use in specifying his/her preferences for delay tolerances, weekly budget quotas etc. The GUI also interfaces with user profiling and recommendation engines of the devices to automate the decision process. The disclosed design facilitates the implementation of features and enriching the user experience of new pricing schemes (e.g. the time-dependent pricing scheme disclosed in the aforementioned provisional patent application entitled System and Methods for Time Dependent Internet Pricing).

For service providers, the disclosed design provides an easy-to-use user interface that allows them to offer the right pricing incentives to their customers for time-dependent pricing (TDP), which in turn helps them to manage congestion, reduce cost, monetize bandwidth assets. The disclosed design provides advantages to device manufacturers (e.g. Apple, Microsoft, Samsung, LG, Nokia, HTC etc.) as having this UI helps their consumers to take advantage of dynamic pricing plans like TDP. The disclosed design allows users to specify their settings, budget, preferences etc., in a hassle-free manner for TDP and similar dynamic pricing plans. The disclosed design provides advantages to device developers, e.g. Apple, Samsung, Microsoft etc., especially if ISPs want to implement time-dependent or similar pricing schemes. The disclosed design provides advantages to the ISPs themselves as the design will facilitate the deployment of time-dependent, congestion-dependent, location-dependent, and usage-based pricing, etc.

It should be understood that many variations are possible based on the disclosure herein. Although features and elements are described above in particular combinations, each feature or element may be used alone without the other features and elements or in various combinations with or without other features and elements. The methods or flow charts provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system configured to delay data delivery to a user device operated by a user, the system comprising:
    a usage monitor and pricing policy engine located on a server, the usage monitor being configured to identify the user and monitor usage patterns of the user device, the pricing policy engine being configured to generate pricing information based on the identity of the user and the usage patterns, the pricing policy engine being configured to generate time dependent pricing information, congestion dependent pricing information and location based pricing information and to transmit the pricing information to the user device;
    a usage controller located on the client device, the client device having a dynamically selected data plan selected from a plurality of data plans and a plurality of delay tolerant applications each configured to request data, the usage controller having a user interface configured to receive a data usage budget and a delay preference selection associated with each application, the usage controller being configured to receive the pricing information from the pricing policy engine and prevent the user from exceeding the data usage budget and delay data usage to each of the delay tolerant applications based on the delay preference selection, the pricing information and the client device's dynamically selected data plan.

2. The system of claim 1 wherein the usage controller is configured to delay data usage to the delay tolerant application based on data usage pricing for a node to which the user device is connected.

3. The system of claim 1 wherein the usage controller is configured to allow data usage to the delay tolerant application when the user device is coupled to a node having data pricing below a preemptive download threshold price.

4. The system of claim 1 wherein the usage controller is configured to temporarily suspend a data usage by the delay tolerant application when the user device is connected to a node having data pricing above a maximum price threshold.

5. The system of claim 4 wherein the usage controller is configured to resume data usage by the delay tolerant application when the user device is connected to a node having data pricing below the maximum price threshold.

6. The system of claim 1 wherein the usage controller is configured to delay data usage to the delay tolerant application based on a congestion level at the node to which the user device is connected.

7. The system of claim 1 wherein the usage controller is configured to delay data usage to the delay tolerant application based on an amount of data used by the user device over a given time period.

8. The system of claim 1 wherein the user interface is configured to allow selection between congestion-dependent, location-dependent, and usage-based pricing plans.

9. The system of claim 8 wherein the user interface is configured to present data usage and time/date information.

10. The system of claim 8 wherein the user interface is configured to present currently available price discounts.

11. The system of claim 8 wherein the user interface is configured to present a historical bandwidth usage of at least two applications running on the user device.

12. A method for delaying data delivery to a user device operated by a user, the method comprising:
receiving user device communications at a server and identifying the user and monitoring usage patterns of the user device;
generating pricing information at the server based on the identity of the user and the usage patterns, the pricing information including time dependent pricing information, congestion dependent pricing information and location based pricing information;
transmitting the pricing information from the server to the user device, the user device having a dynamically selected data plan selected from a plurality of data plans and a plurality of delay tolerant applications each configured to request data; and
receiving a data usage budget and a delay preference selection associated with each delay tolerant application at the user device; and
receiving pricing information at the user device and preventing the user from exceeding the data usage budget and delaying data usage to each of the delay tolerant applications based on the delay preference selection, the pricing information, and the client device's dynamically selected data plan.

13. A non-transitory computer-readable medium having stored thereon a computer program for execution by a processor configured to perform a method for delaying data delivery to a user device operated by a user, the method comprising:
receiving user device communications at a server and identifying the user and monitoring usage patterns of the user device;
generating pricing information at the server based on the identity of the user and the usage patterns, the pricing information including time dependent pricing information, congestion dependent pricing information and location based pricing information;
transmitting the pricing information from the server to the user device, the user device having a dynamically selected data plan selected from a plurality of data plans and a plurality of delay tolerant applications each configured to request data; and
receiving a data usage budget and a delay preference selection associated with each delay tolerant application at the user device; and
receiving pricing information at the user device and preventing the user from exceeding the data usage budget and delaying data usage to each of the delay tolerant applications based on the delay preference selection, the pricing information, and the client device's dynamically selected data plan.

\* \* \* \* \*